(12) United States Patent
Sharpstone et al.

(10) Patent No.: US 12,078,287 B2
(45) Date of Patent: Sep. 3, 2024

(54) BRACKET FOR SECURING A DEVICE

(71) Applicant: Aspen Pumps Limited, Hailsham (GB)

(72) Inventors: Joseph Sharpstone, Hailsham (GB); Jack Mabon, Hailsham (GB); Chris Forshaw, Hailsham (GB); Philip Capon, Hailsham (GB)

(73) Assignee: Aspen Pumps Limited, Hailsham (GB)

( * ) Notice: Subject to any disclaimer, the term of this patent is extended or adjusted under 35 U.S.C. 154(b) by 105 days.

(21) Appl. No.: 17/796,459

(22) PCT Filed: Jan. 5, 2021

(86) PCT No.: PCT/GB2021/050023
§ 371 (c)(1),
(2) Date: Jul. 29, 2022

(87) PCT Pub. No.: WO2021/152285
PCT Pub. Date: Aug. 5, 2021

(65) Prior Publication Data
US 2023/0341083 A1  Oct. 26, 2023

(30) Foreign Application Priority Data
Jan. 29, 2020 (GB) .................................. 2001238

(51) Int. Cl.
*F16M 11/00* (2006.01)
*F04B 53/00* (2006.01)
(Continued)

(52) U.S. Cl.
CPC ........... *F16M 13/02* (2013.01); *F04B 53/003* (2013.01); *F04B 53/16* (2013.01)

(58) Field of Classification Search
CPC ....... F16M 13/02; F04B 53/003; F04B 53/16; F04B 53/22; F16B 5/0685; F16B 21/07; E04B 9/006; F24F 13/222
See application file for complete search history.

(56) References Cited

U.S. PATENT DOCUMENTS 2,191,782 A * 9/1940 Valane .................... A61G 7/05
24/339
4,315,411 A  2/1982 Hoop
(Continued)

FOREIGN PATENT DOCUMENTS

DE        7624077 U1      3/1977
KR     20140058840 A      5/2014

OTHER PUBLICATIONS

Combined Search and Examination Report for corresponding Application No. GB2001238.1 dated Jul. 23, 2020, 5 pages.
(Continued)

*Primary Examiner* — Amy J. Sterling
(74) *Attorney, Agent, or Firm* — Taft Stettinius & Hollister LLP

(57) ABSTRACT

A bracket for securing a device to an elongate structure, the bracket comprising a body configured to hold the device, and a securing element attached to the body. The securing element comprises a pair of bosses, each boss comprising a slot, a core and an end surface. The bosses are arranged on the securing element such that the end surfaces define a gap into which the elongate structure can be received when the securing element is in a first position relative to the elongate structure and the slots are configured to receive the elongate structure upon rotation of the securing element from the first position to a second position relative to the elongate structure. The bracket is secured to the elongate structure by a gripping inter-engagement of the elongate structure and the bosses of the securing element in said second position.

20 Claims, 5 Drawing Sheets

(51) Int. Cl.
*F04B 53/16* (2006.01)
*F16M 13/02* (2006.01)

(56) References Cited

U.S. PATENT DOCUMENTS

| | | | | |
|---|---|---|---|---|
| 4,468,222 | A | | 8/1984 | Lundquist |
| 5,024,405 | A | * | 6/1991 | McGuire .................. F16L 3/12 |
| | | | | 248/74.1 |
| 5,351,920 | A | * | 10/1994 | Decky ...................... F16L 3/13 |
| | | | | 248/74.1 |
| D477,770 | S | * | 7/2003 | Baker ............................ D8/396 |
| 6,631,876 | B1 | | 10/2003 | Phillips |
| 8,091,846 | B1 | * | 1/2012 | Britner ..................... B25H 1/00 |
| | | | | 248/219.3 |
| D759,474 | S | * | 6/2016 | Pittman .......................... D8/395 |
| 10,018,216 | B1 | * | 7/2018 | Espinosa ............. F16B 37/0814 |
| 10,274,110 | B1 | | 4/2019 | Liu |
| 10,368,671 | B2 | * | 8/2019 | Berg .................... A45C 13/262 |
| 2007/0195639 | A1 | | 8/2007 | Oswald |
| 2018/0071454 | A1 | | 3/2018 | Betts |

OTHER PUBLICATIONS

International Search Report for corresponding Application No. PCT/GB2021/050023 dated Feb. 22, 2021, 6 pages.
Written Opinion for corresponding Application No. PCT/GB2021/050023 dated Feb. 22, 2021, 22 pages.

* cited by examiner

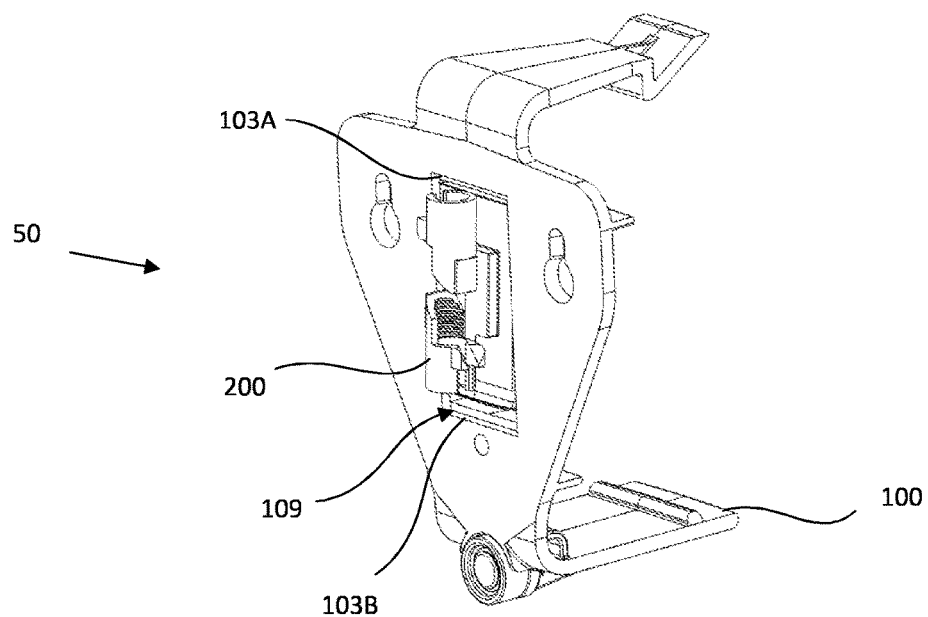
FIG. 1
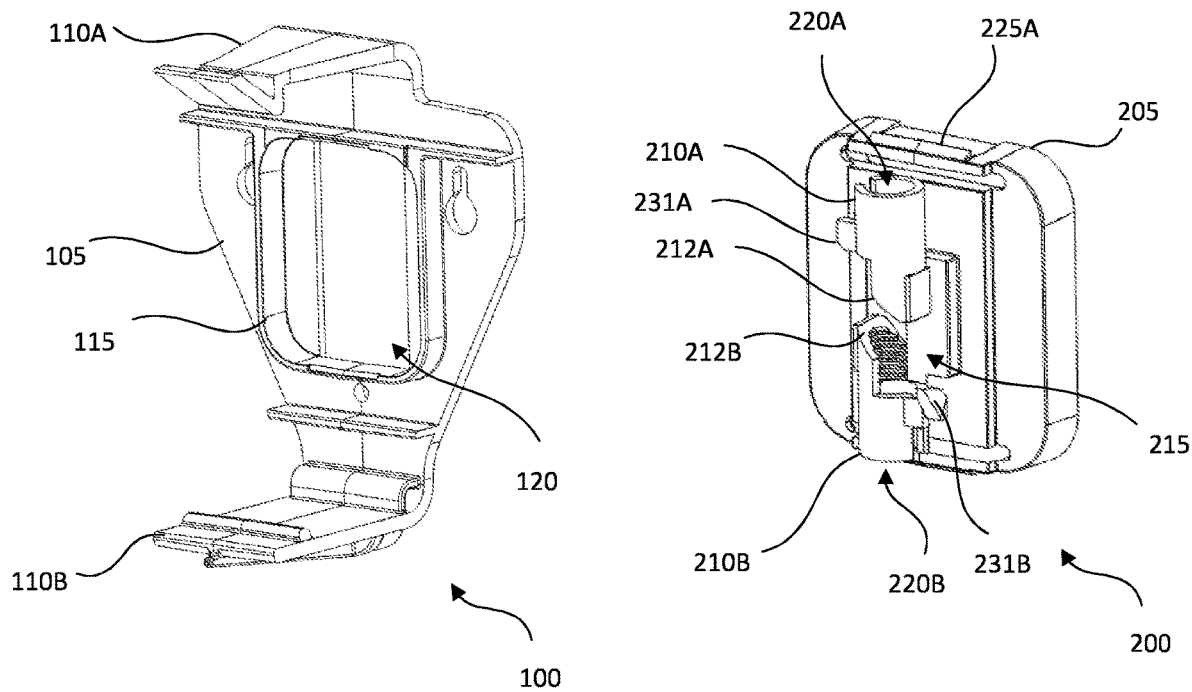
FIG. 2
FIG. 3

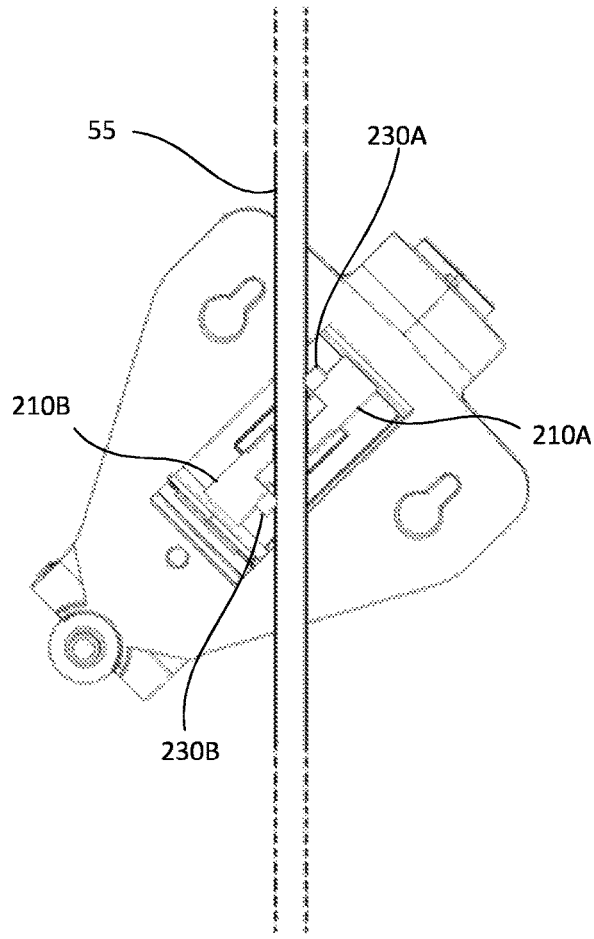
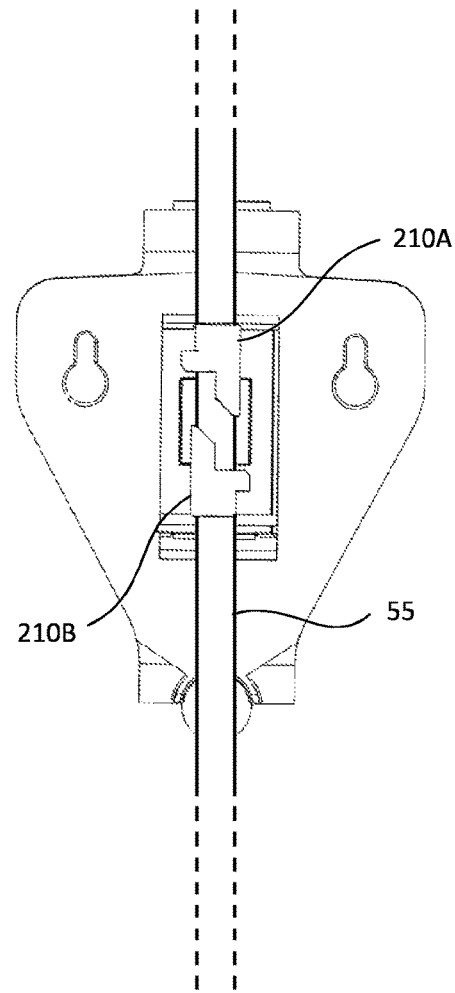
FIG. 7A
FIG. 7B

BRACKET FOR SECURING A DEVICE

CROSS REFERENCE TO RELATED APPLICATIONS

This is a U.S. National Stage Application of, and claims priority to, PCT/GB2021/050023, filed Jan. 5, 2021, which further claims priority to UK patent application s/n GB2001238.1, filed Jan. 29, 2020, the contents of each is incorporated herein by reference in its entirety.

This invention relates to a bracket for securing a device and methods thereof.

BACKGROUND

Devices, such as condensate pumps, are often mounted to surfaces, such as a wall of a room or building, typically using a bracket as this provides a convenient way of releasably securing the pump to that surface. Brackets suitable for releasably mounting a pump to a wall are known and often use mechanical fixings such as screws to secure the bracket to the wall and therefore securing the pump, in turn to the wall in a way that the pump can be released, for example to facilitate maintenance and inspection. However, this approach results in vibrations caused by the pump motor being transmitted to the wall via the bracket, which generates undesirable amounts of noise.

Condensate pumps typically use a motor to pump condensate from a liquid reservoir, for example from an air-conditioning unit, and so it is desirable to locate the pump near the air-conditioning unit, as this reduces the length of hose needed to connect the pump with the air-conditioning unit. As air-conditioning units are typically mounted at the top of walls, it is therefore, desirable to mount the pump high up on the wall in the vicinity of the air-conditioning unit. However, it is undesirable to mount the pump within the space being conditioned as this is unsightly and makes for a noisier environment.

As it is undesirable to mount pumps in the space being conditioned, the pump can instead be located in a space above the air-conditioning unit, for example within a ceiling cavity, if such a cavity is present. This makes for a more aesthetic space, as the pump is not visible in the space being conditioned, and the noise generated by the pump motor is also less audible in the space. However, there are often fewer walls present in such a space, as internal walls of a building may not be replicated in the ceiling space above which may instead be a continuous cavity. In this case, the pump may simply rest on a ceiling panel or framework above the space below. This is clearly undesirable, as the noise of the pump can be transmitted through the ceiling to the space below and the pump is not secured. However, as there may not be walls in close proximity to the air-conditioning unit, it may also not be possible to mount the pump securely using a conventional bracket, as only structures to support ceiling services may be present in the ceiling cavity. For example, the ceiling cavity may only contain cables to support lighting panels, or stud (i.e. a threaded rod) or fittings for ducting or sensors present in the ceiling.

The present invention seeks to alleviate at least some of these issues.

BRIEF SUMMARY OF THE DISCLOSURE

Viewed from a first aspect, the present invention provides a bracket for securing a device to an elongate structure, the bracket comprising a body configured to hold the device, and a securing element attached to the body. The securing element comprises a pair of bosses, each boss comprising a slot, a core and an end surface. The bosses are arranged on the securing element such that the end surfaces define a gap into which the elongate structure can be received when the securing element is in a first position relative to the elongate structure and the slots are configured to receive the elongate structure upon rotation of the securing element from the first position to a second position relative to the elongate structure. The bracket is secured to the elongate structure by a gripping inter-engagement of the elongate structure and the bosses of the securing element in said second position.

The present invention provides a bracket that can secure a pump to existing elongate structures, such as threaded rod or suspension cable, in a ceiling cavity, thus providing a more flexible installation process. Existing elongate structures present in a ceiling cavity can be utilised, as the bracket is simply pressed onto the elongate structure and rotated to grip the structure.

The gap may extend in a first direction, and the respective cores may define a channel extending in a second direction different to the first direction. The angle between the first direction and the second direction may be between 45 degrees and 90 degrees. This provides bosses having sufficient strength and rigidity, as only the necessary material is removed in order to provide the gap.

Each boss may comprise a resiliently deformable material. Thus, as the bracket is rotated, the bosses are able to deform to accommodate the elongate structure, and once the elongate structure is received in the respective cores, the bosses are able to grip the elongate structure more securely.

The securing element may be releasably attached to the body. One example of a releasable attachment may be by a mechanical connection such as a snap-fit joint. The mechanical connection may be a snap-fit connection between the body and the securing element. A releasable securing element allows the body and securing element to be separately manufactured and combined. For example, a single body may be used with a variety of securing elements, each configured to secure to a different elongate structure. For example, the securing element may be configured to engage with elongate structures of different diameters, cross-sectional profiles, etc.

The body may comprise a back plate and a pair of fingers extending therefrom. The pair of fingers may be configured to engage with a pair of opposed surfaces of the device so as to support the device. For example a protrusion on each of the respective fingers can be inserted into corresponding grooves formed on opposed surfaces of the housing of the device so that a more robust connection between the bracket and device is provided.

The back plate may comprise at least one mounting holes for securing the bracket to an external surface. Providing mounting holes further enhances the flexibility provided by a single bracket, as the body may be mounted to a wall in the usual manner, without use of a securing element, thus providing a bracket that can be retrofitted to existing mounting points. However, should it be necessary to secure the pump to an elongate structure, the body can simply be released from the wall, connected to a securing element and connected to the elongate structure.

The back plate may further comprise a raised section defining a cavity for receiving the securing element. The securing element may further comprise a base. In an installed configuration, the base may be secured in the cavity on one side of the back plate and the bosses may protrude through the back plate to be disposed on an other side of the back plate. By locating the base in a cavity, the securing element is thus more securely held by the body.

The respective cores of the bosses may be co-linear.

The body may comprise a resiliently deformable member configured to reduce the transmission of vibrations between the structure and the bracket. The resiliently deformable member may be mounted on a lower portion of the body. The resiliently deformable member advantageously reduces the vibrations transmitted to the elongate structure, and thus the noise generated during operation of the device. By locating the resiliently deformable member on a lower portion of the body, any vibrations generated by the device are better absorbed, as the weight of the device pivots the device and bracket and presses the lower portion of the body into the elongate structure or wall.

The elongate structure may be any of a rod, a cable and a wire. The device may be a pump. Securing elements configured to engage with these structures are particularly advantageous, as these are structures that are already found in ceiling cavities, which means an installer does not need to provide additional components to secure the device, which in turn increases the flexibility of installation.

The present invention includes a securing element for use in a bracket as claimed in any of the appended claims. The present invention includes a body for use in a bracket as claimed in any of the appended claims.

Viewed from an independent aspect, the present invention includes a mounting kit comprising a body according to the appended claims and a securing element according to the appended claims.

The mounting kit may further comprise a pair of adapters configured to secure the elongate structure within a respective boss. Each of the adapters may be sized so as to fit within a respective boss.

Each of the adapters may comprise a slot and a core. The core of the adapter may be configured to receive the elongate structure via the slot of the adapter. The cross-sectional area of the core may be larger than the cross-sectional area of the elongate structure. Each boss may be configured to grip the elongate structure using the respective adapter. The use of adapters with the bracket is particularly advantageous, as a securing element can engage a variety of elongate structures, particularly where the elongate structure has a smaller cross-sectional area compared to the cross-sectional area of the boss. For example, a securing element designed to grip a rod having a diameter of 8 mm may use an adapter in order to grip a cable having a diameter of 2 mm. Thus, a single securing element may be used in a variety of applications.

Viewed from an independent aspect, the present invention includes an adapter for use in a mounting kit as defined in the appended claims.

Viewed from a further independent aspect, the present invention includes a method of mounting a bracket to an elongate structure, the method comprising providing a bracket according to any of the appended claims, pressing the bracket onto the structure so as to locate the structure in the gap, and rotating the bracket such that the structure passes through the respective slots and into the respective cores of the bosses. The adapters may comprise a resiliently deformable material.

The method may include the steps of providing a pair of adapters according to the appended claims, and pressing the pair of adapters against the structure so as to locate the structure in the respective core of the adapters before pressing each of the adapters into the core of the respective bosses. This is particularly advantageous, as it will often be easier to secure each adapter to the structure before pressing the adapter into the core of the securing element to secure the bracket to the structure.

The method may include the steps of providing a pair of adapters according to the appended claims, and pressing one of the adapters into the core of each boss. Rotating the bracket may cause the structure to enter the core of the respective adapter via the slot of the respective adapter. Pressing the adapters into the bosses of the securing element before the bracket is secured to the structure allows for brackets to be configured in advance and thus the user is able to more quickly secure the bracket to a structure that would otherwise be unsuitable for the bracket.

BRIEF DESCRIPTION OF THE DRAWINGS

Embodiments of the invention are further described hereinafter with reference to the accompanying drawings, in which:

FIG. 1 illustrates a bracket according to the present disclosure;

FIG. 2 illustrates a perspective view of a body of the bracket of FIG. 1;

FIG. 3 illustrates a perspective view of a securing element of the bracket of FIG. 1;

FIGS. 7A & 7B illustrate the bracket and elongate structure in the first and second positions respectively;

DETAILED DESCRIPTION

Figure 5:
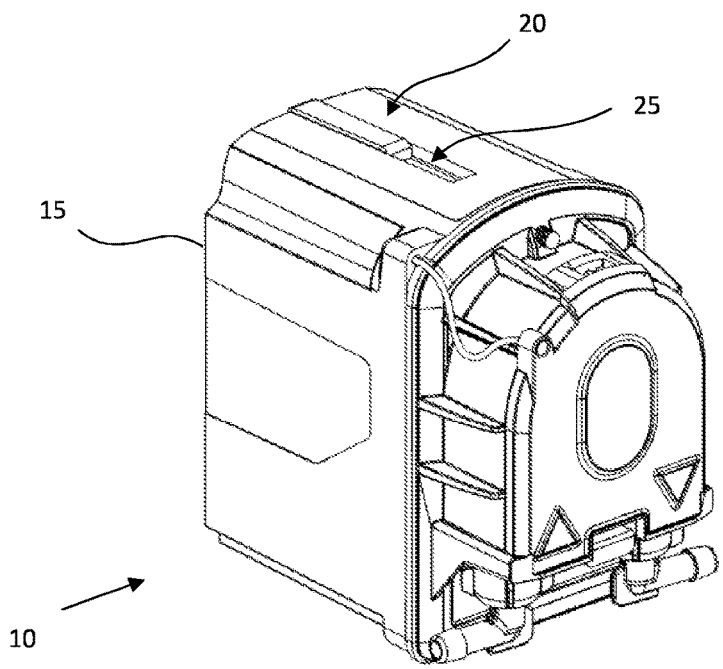
FIG. 5 illustrates a pump that can be secured by the bracket of FIG. 1.

FIG. 1 illustrates a bracket 50 made up of a body 100 and a securing element 200. FIGS. 2 and 3 illustrate the body 100 and securing element 200 in greater detail. The body 100 has a back plate 105, a first finger 110A and a second finger 110B. The first 110A and second 110B fingers extend from opposed ends of the same side of the back plate 105 and are arranged to secure a pump 10 (see also FIG. 5) to a structure, such as a rod 55 (see FIG. 8) by engaging opposed surfaces of the pump. A raised section 115 on the same side of the back plate 105 defines a cavity 120 into which the securing element 200 can be inserted. The securing element 200 has a base 205, a first boss 210A and a second boss 210B spaced apart from one another. The base 205 has ridges 225A, 225B on opposed ends of the base 205 (see FIG. 6A) that engage with corresponding edges 103A, 103B of the back plate 105. The raised section 115 also has ridges 145A, 145B on opposed ends thereof that engage with corresponding edges 207A, 207B of the base 205. Together, the ridges 145A, 145B, 225A and 225B act as mechanical snap-fit joints to secure the securing element 200 within the cavity 120 of body 100. Thus a user can simply press the appropriate securing element 200 into the cavity 120 and audible feedback from the engagement of the ridges 145, 225 confirms that the securing element 200 is secured to the body 100.

Figure 8:
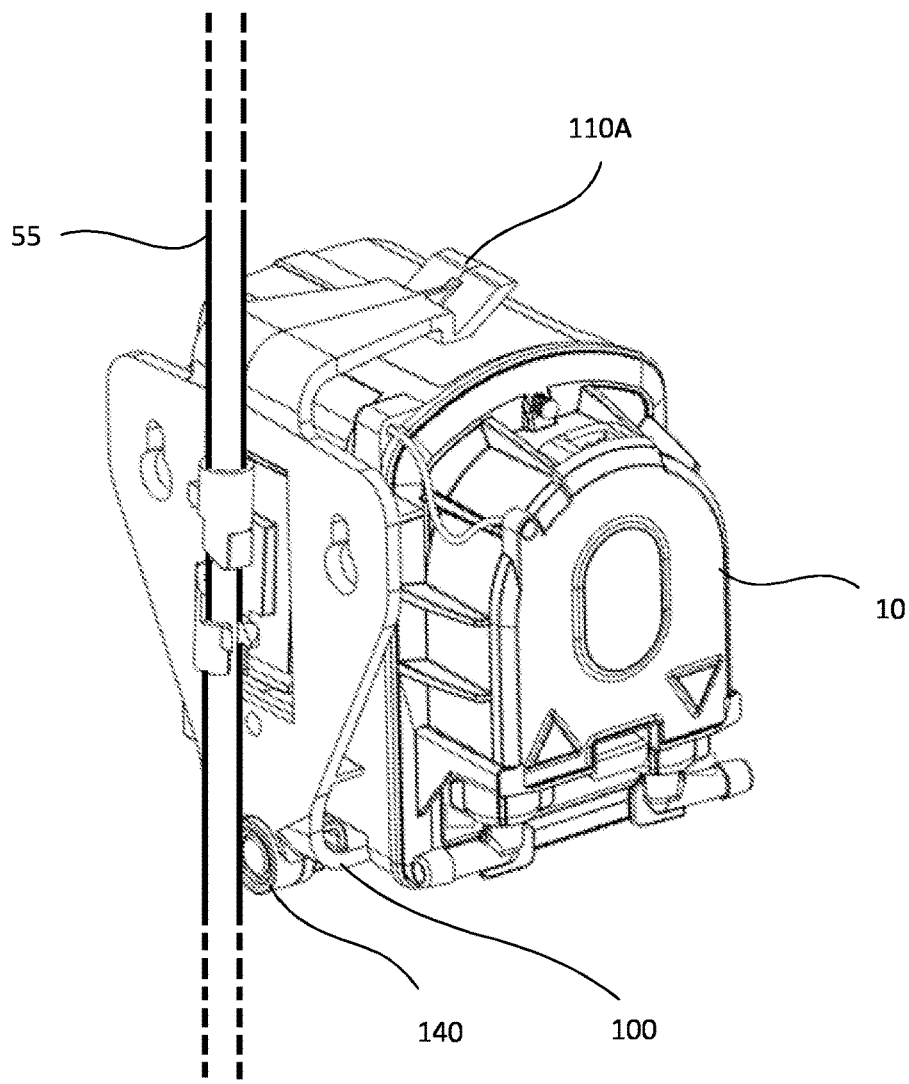
FIG. 8 illustrates the pump of FIG. 5 secured to an elongate member.

As shown, the back plate 105 has a window 109 through which the bosses 210A, 210B of the securing element 200 pass through and protrude from. As shown in FIG. 8, the pump 10 is preferably located on the side of the back plate 105 having the raised section 115, as this further helps to prevent separation of the securing element 200 from the body 100. In certain embodiments, therefore, the snap-fit connection between the securing element and the body 100 could be omitted. As illustrated, the window 109 is smaller than the cavity 120, which results in portions 107 of the back plate 105 extending across the cavity 120 to act as a mechanical stop defining how far the bosses project beyond the back plate and retaining the securing element within the cavity 120.

Figure 4A:
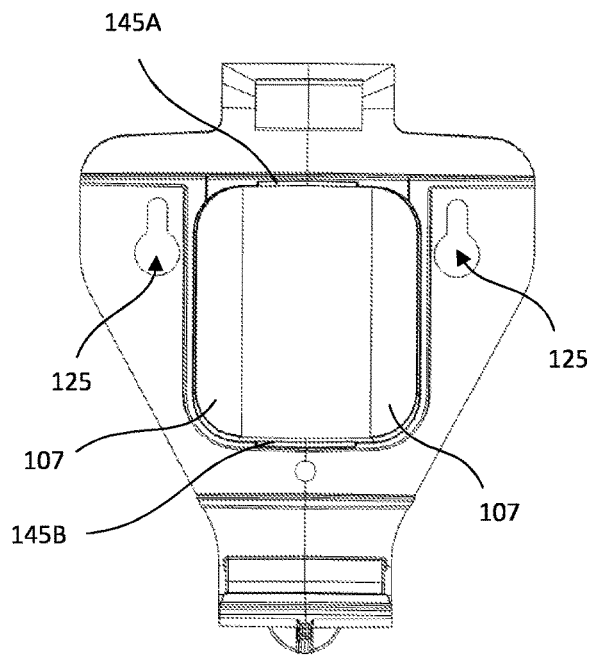
FIGS. 4A & 4B illustrate frontal and side views of the body of FIG. 2.
Figure 4B:
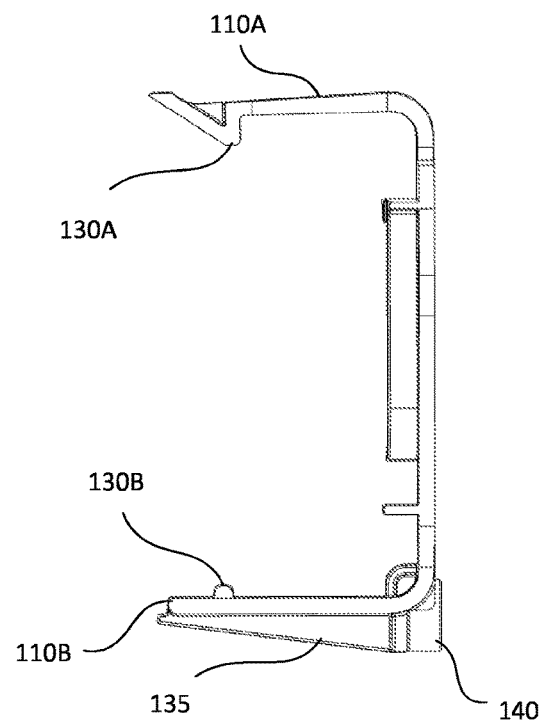

As shown in FIG. 4B, the two fingers 110A, 110B extend from the back plate 105 in a substantially perpendicular direction to a plane defined by the back plate 105. The first finger 110A extends from the top of the back plate and has a protrusion 130A configured to engage with a corresponding groove 25 in a upper side 20 of a housing 15 of the pump 10 (see FIGS. 5 and 8). The second finger 110B extends from the bottom of the back plate 105 and has a protrusion 130B configured to engage with a corresponding groove (not shown) in the underside of the pump housing 15. The fingers 110A, 110B are configured to engage opposed sides of the housing 15 when the protrusions 130A, 130B are located within the respective grooves 25 in the housing 15. As the first 110A and second 110B fingers are preferably resiliently deformable, this allows for some deflection of the fingers 110A, 110B to accommodate the pump 10 as it is pressed towards the back plate 105. Once the pump 10 has been pressed sufficiently close to the back plate 105, the fingers 110A, 110B deflect back towards their original position as their respective protrusions 130A, 130B are received by grooves 25 in the pump housing 15 to securely hold the pump in the bracket.

While first finger 130A has been bent to provide the protrusion 130A of the first finger 110A, it would be apparent this was not essential, and that a substantially straight finger having a protrusion thereon would be adequate to engage with the housing 15. However, the upwardly canted distal end of the first finger 130A provides a convenient surface for a user to urge the first finger 130A away from the second finger 130B in order to release the pump from the bracket. Whilst the fingers 110A, 110B are shown having protrusions, it would be apparent this was not essential, and that the fingers 110A, 110B may each have a groove configured to receive corresponding protrusions on the housing 15 in order to provide the engagement between the housing 15 and the fingers 110A, 110B. Further, it would be apparent that the ends of the fingers 110A, 110B may simply be angled such that the end-most points of the fingers 110A, 110B are received within grooves 25 in the housing 15.

The body 100 also has a supporting rib 135 extending underneath the second finger 110B. The supporting rib 135 is provided to stiffen the second finger 110B, as the second finger 100B will act as a platform, bearing the majority of the weight of the pump 10 when secured in the bracket 50. An anti-vibration mount 140 is also provided on a lower portion of the side plate 105 adjacent to where the second finger 110B connects to the side plate 105. Specifically, the anti-vibration mount 140 is positioned between the contact point of the bracket 50 and the rod 55 or wall to which it is mounted, so that transmissions primarily pass through the anti-vibration mount 140 to reach the wall or rod 55. The anti-vibration mount 140 is preferably made of a thermoplastic elastomeric material. As illustrated in FIG. 4A, the back plate 105 has two mounting holes 125 to provide flexibility to mount the bracket 50 to a wall instead of the rod 55, in which case the securing element 200 would not be clipped into place in the body.

The first boss 210A and second boss 210B, each have a respective end surface 212A, 212B (see FIG. 3) which, in combination, define a gap 215 into which the rod 55 can be inserted (see FIG. 7A). The first boss 210A has a first core 220A and the second boss 210B has a second core 220B, and both cores 220A, 220B are sized to receive the rod 55 (see FIG. 7B). As shown in FIG. 6B, the cores 220A, 220B of the first 210A and second 210B bosses define a channel 222 through which the rod 55 passes when the securing element 200 is secured to the rod 55.

Figure 6A:
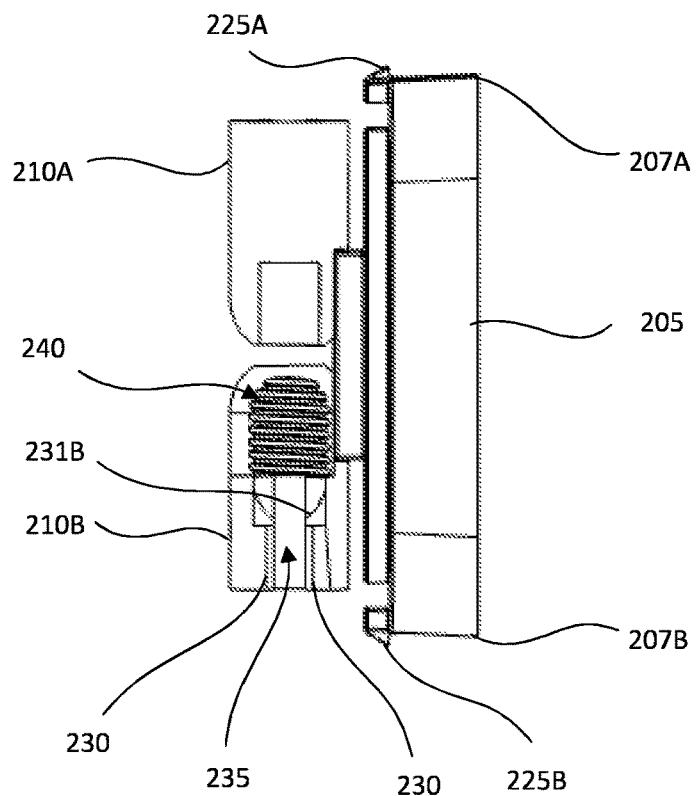
FIGS. 6A & 6B illustrate side and plan views of the securing element of FIG. 3.
Figure 6B:
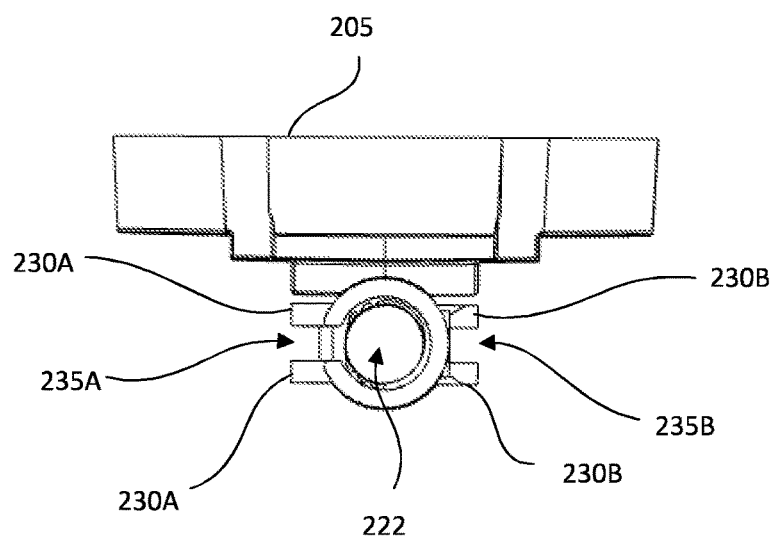

As shown in FIGS. 6A and 6B, the first boss 210A is formed of a substantially tubular body having a pair wings 230A and the second boss 210B is formed of a substantially tubular body having a pair of wings 230B. The pairs of wings 230A, 230B are spaced to define respective slots 235A, 235B between the respective pairs of wings 230A, 230B. As illustrated, each slots 235A, 235B extends in a substantially parallel direction to a longitudinal axis of the respective core 220A, 220B, and the respective slots extend in opposite directions to one another. With reference to FIG. 3 and FIGS. 7A & 7B, the gap 215 extends in a different direction to that of the channel 222. Typically, the direction of the gap 215 and the direction of the channel 222 form an acute angle. The wings 230A, 230B are also resiliently deformable and can be deflected to provide an opening through which the rod 55 can be inserted into the respective cores 220A, 220B. While the cross-sectional profile of the bosses 210A, 210B is shown as being substantially circular, it would be apparent this was not essential and the bosses 210A, 210B may have a non-circular cross-sectional profile. However, for attachment to an elongate member having a circular cross-sectional profile, it can be advantageous for the channel 222 defined by the bosses to have a substantially matching circular cross-sectional profile so as to maximise the mutual surface engagement between the securing element 200 and the elongate member for a more secure grip. At least a portion 240 of the inner surface of the bosses 210A, 210B may be threaded, for engagement with a correspondingly threaded rod 55.

FIGS. 7A and 7B illustrate a process by which the bracket 50 can be mounted to the rod 55. As shown in FIG. 7A, the assembled bracket 50 is pressed into a first position, angled relative to the rod 55 such that the rod 55 is located in the gap 215 between the bosses 210A, 210B. The bracket 50 can then be rotated to the second position relative to the rod 55 (FIG. 7B) such that the rod 55 is secured within the channel 222. As the bracket 50 is rotated, the rod 55 pushes the wings 230A, 230B apart and slides into the cores 220A, 220B. The wings 230A, 230B may each include a chamfered surface 231A, 231B to help stabilise the rod 55 on the wings 230A, 230B when rotating the bracket 50 from the first position to the second position. The resilience of the wings 230A, 230B allows the rod 55 to pass through the slots 235A, 235B as widened by a camming action against the chamfered surfaces 231A, 231B, with the wings returning to their original positions once the rod has passed through into the channel 222 to be gripped by the cores 220A, 22B, thus securing the bracket 50 to the rod 55. The rod 55 may have a cross-sectional area slightly larger than that of the cores 220A, 220B, so that the wings 230A, 230B will remain in a slightly separated configuration to ensure that the rod 55 is firmly gripped once it is in the channel 222. Once the bracket 50 is in the second position, the threaded inner surface 240 of the bosses 210A, 210B can interlock with a threaded outer surface of the rod 55, thus providing a secure mechanical engagement between the rod 55 and the bracket 50. Thus, in addition to the frictional engagement between the bosses 210A, 210B and the rod 55 to grip the rod 55, features on the internal surface of the bosses 210A, 210B may provide positive engagement with corresponding surface features on the rod 55 to enhance the grip of the bosses 210A, 210B on the rod 55.

Once the bracket is secured to the rod 55, the bracket 50 can be rotated about a longitudinal axis of the rod 55 to secure the bracket 50 to the rod 55 in the second position. The threaded surface 240 of the boss and the threaded surface of the rod 55 act as a screw thread which allows for fine adjustment of the position of the bracket, ergo the pump 10 along the longitudinal axis of the rod 55. Thus, the user only needs to locate the bracket at roughly the correct position along the rod 55, before securing the bracket 50 and then mounting the pump 10 thereto. Once the pump 10 is mounted, the user can then make any fine adjustments to finalise the position of the bracket 50 without having to remove the bracket 50 from the rod 55. In addition to enabling fine adjustments along the rod 55, the user can also rotate the bracket 50, once the pump is mounted thereto, for example to accommodate liquid inlet tubes, liquid outlet tubes, power cables, sensor cables and any other accessories in the ceiling cavity that are connected to the pump 10. To release the bracket 50, the user simply has to rotate the bracket 50 to locate the rod 55 in the gap 215 before pulling the bracket 50 free from the rod 55. To separate the pump 10 from the bracket 50, the user need only separate the fingers 110A, 110B to release the pump 10. The user can then release the bracket 50 from the rod 55 in the manner described above.

While a rod 55 has been described as one example of an elongate structure that would be suitable for mounting the bracket 50 to, it would be apparent this was merely exemplary. In some cases, a separate mating bracket having a suitable elongate structure may be used instead of a ceiling rod. It would also be apparent that it is not essential for the rod to be linear, and that non-linear structures would also be suitable for use with the presently described bracket 50. Further, it would be apparent that while the cores 220A, 220B are preferably co-linear, it would be apparent that this was not essential and that the cores 220A, 220B may define a channel 222 having a non-linear path. This may be advantageous where the bracket 50 is to be mounted to a non-linear structure. Thus, the non-linear structure could still be received in the gap 215 between the bosses 210A, 210B and the bracket 50 rotated in the manner described above to secure the bracket 50 to the non-linear structure.

Figure 9:
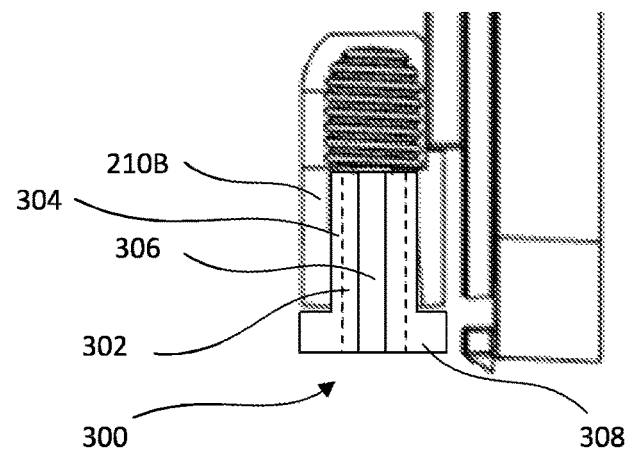
FIG. 9 illustrates an adapter located within a core of the securing element.

The cores 220A, 220B can be considered to define a reference cross-sectional area. Structures having a cross-sectional area smaller than the reference cross-sectional area will not be gripped by the bosses 210A, 210B. Preferably, the structure should have a cross-sectional area slightly larger than the reference cross-sectional area for the reasons given above. Therefore, when the bracket 50 needs to be mounted to a ceiling wire or cable having a smaller cross-sectional area than the reference cross-sectional area, an adapter 300 (see FIG. 9) should be used to secure the bracket 50 to the ceiling wire. The adapter 300 has a body 302 and a core 304 (shown in phantom) configured to receive the wire and a slot 306 configured to allow the wire to pass through the body 302 of the adapter and into the core. The adapter 300 may include a head 308 that is wider than the body 302 to positively locate the adapter body in the associated core 220A, 220B. The adapter 300 is preferably made from an elastomeric material so the user is able to press the adapters around the wire before pressing an adapter into the core 220 of a respective boss 210. When the adapter 300 is pressed into the core 220, the resilience of the wings 230 will squeeze the adapter around the wire, thus securing the bracket 50 to the wire.

It would also be apparent that it is not essential for the user to press the adapters 300 around the wire first, but instead can press an adapter into each of the bosses 210A, 210B before pressing the bracket 50 onto the wire and rotating the bracket 50 to secure the wire within the core of the adapter. In this case, the user would need to ensure the slots 306 of each adapter are aligned with that of the associated core 210 in order to allow the wire to reach the core of the adapter.

Where there is a wall or surface to which the pump 10 can be mounted, the user only needs to use the body 100 of the bracket 50 to secure the pump 10 to the wall. This can be achieved, for example, via the mounting holes 125 formed in the back plate 105, which allows the user to screw the body 100 to the wall in the conventional manner. The pump 10 can then be secured to the body 100 in the manner described above. Thus the body 100 can also function as a retrofittable bracket for use with existing devices and mounting points.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A bracket for securing a device to an elongate structure, the bracket comprising:
   a body adapted to hold the device and that includes a back plate and a pair of fingers extending therefrom, wherein the pair of fingers are adapted to respectively engage with a pair of opposing surfaces of the device to support the device; and
   a securing element attached to the body,
   wherein the securing element including bosses, each boss includes a slot, a core and an end surface,
   wherein the bosses are arranged on the securing element, such that the end surfaces cooperatively define a gap into which the elongate structure can be received when the securing element is in a first position relative to the elongate structure, and the slots are adapted to receive the elongate structure upon rotation of the securing element from the first position to a second position relative to the elongate structure,
wherein the bracket is secured to the elongate structure by a engagement of the elongate structure and the bosses of the securing element in the second position, and wherein the back plate includes a raised section defining a cavity for receiving the securing element, the securing element includes a base that is adapted to be secured in the cavity on a first side of the back plate, and the bosses protrude through the back plate and are disposed on a second side of the back plate.

2. A bracket as claimed in claim 1, wherein the gap extends in a first direction, and wherein the cores cooperatively define a channel extending in a second direction different to the first direction.

3. A bracket as claimed in claim 2, wherein the angle between the first direction and the second direction is between 45 degrees and 90 degrees.

4. A bracket as claimed in claim 1, wherein each of the bosses includes a resiliently deformable material.

5. A bracket as claimed in claim 1, wherein the securing element is releasably attached to the body.

6. A bracket as claimed in claim 1, wherein the back plate includes a mounting hole for securing the bracket to an external surface.

7. A bracket as claimed in claim 1, wherein the cores of the bosses are co-linear relative to each other.

8. A bracket as claimed in claim 1, wherein the body includes a resiliently deformable member adapted to reduce transmission of vibrations between the structure and the bracket.

9. A bracket as claimed in claim 1, wherein the structure is selected from the group consisting of a rod, a cable, and a wire.

10. A securing element for use in a bracket as claimed in claim 1.

11. A mounting kit comprising a body and securing element according to claim 1.

12. A mounting kit as claimed in claim 11, further comprising adapters adapted to secure the elongate structure within respective bosses, wherein the adapters are sized to fit within respective bosses.

13. A method of mounting a bracket to an elongate structure, the method comprising: providing the bracket of claim 1, pressing the bracket onto the structure to locate the structure in the gap, and rotating the bracket such that the structure passes through the respective slots and into the respective cores of the bosses.

14. A bracket for securing a device to an elongate structure, the bracket comprising:
a body adapted to hold the device, wherein the body includes a resiliently deformable member adapted to substantially reduce transmission of vibrations between the structure and the bracket; and
a securing element attached to the body,
wherein the securing element including bosses, each boss includes a slot, a core and an end surface,
wherein the bosses are arranged on the securing element such that the end surfaces cooperatively define a gap into which the elongate structure can be received when the securing element is in a first position relative to the elongate structure, and the slots are adapted to receive the elongate structure upon rotation of the securing element from the first position to a second position relative to the elongate structure, and
wherein the bracket is secured to the elongate structure by a engagement of the elongate structure and the bosses of the securing element in the second position.

15. A bracket as claimed in claim 14, wherein the resiliently deformable member is mounted on a lower portion of the body.

16. A bracket for securing a pump to an elongate structure, the bracket comprising:
a body adapted to hold the device; and
a securing element attached to the body,
wherein the securing element includes bosses, each boss includes a slot, a core and an end surface,
wherein the bosses are arranged on the securing element such that the end surfaces cooperatively define a gap into which the elongate structure can be received when the securing element is in a first position relative to the elongate structure and the slots are adapted to receive the elongate structure upon rotation of the securing element from the first position to a second position relative to the elongate structure, and
wherein the bracket is secured to the elongate structure by a gripping engagement of the elongate structure and the bosses of the securing element in the second position.

17. A mounting kit for securing a device to an elongate structure, the mounting kit comprising:
a body adapted to hold the device; and
a securing element attached to the body, wherein the securing element including bosses, each boss includes a slot, a core and an end surface; and
adapters adapted to secure the elongate structure within respective bosses, wherein the adapters are sized so as to fit within respective bosses,
wherein the bosses are arranged on the securing element such that the end surfaces cooperatively define a gap into which the elongate structure can be received when the securing element is in a first position relative to the elongate structure, and the slots are adapted to receive the elongate structure upon rotation of the securing element from the first position to a second position relative to the elongate structure, and
wherein the bracket is secured to the elongate structure by a gripping engagement of the elongate structure and the bosses of the securing element in the second position.

18. A mounting kit as claimed in claim 17, wherein each of the adapters includes a resiliently deformable material.

19. A mounting kit as claimed in claim 17, wherein each of the adapters includes a slot and a core, wherein the cores are adapted to receive the elongate structure via the slot of the respective adapters, wherein the cross section of the core is larger than the cross section of the elongate structure, and wherein each boss is adapted to frictionally engage the elongate structure using the respective adapter.

20. An adapter for use in a mounting kit as claimed in claim 17.

* * * * *